(12) United States Patent
Holden

(10) Patent No.: US 11,333,283 B2
(45) Date of Patent: May 17, 2022

(54) NO-CRIMP VALVE ASSEMBLY

(71) Applicant: Keeney Holdings LLC, Cleveland, OH (US)

(72) Inventor: James H. Holden, Glastonbury, CT (US)

(73) Assignee: Keeney Holdings LLC, Cleveland, OH (US)

( * ) Notice: Subject to any disclaimer, the term of this patent is extended or adjusted under 35 U.S.C. 154(b) by 4 days.

(21) Appl. No.: 16/413,653

(22) Filed: May 16, 2019

(65) Prior Publication Data

US 2020/0056734 A1 Feb. 20, 2020

Related U.S. Application Data

(60) Provisional application No. 62/719,163, filed on Aug. 17, 2018.

(51) Int. Cl.
*F16L 47/04* (2006.01)
*F16L 33/22* (2006.01)
(Continued)

(52) U.S. Cl.
CPC .............. *F16L 47/04* (2013.01); *F16L 19/086* (2013.01); *F16L 29/002* (2013.01);
(Continued)

(58) Field of Classification Search
CPC ....... F16L 19/086; F16L 19/083; F16L 19/08; F16L 29/002; F16L 33/224; F16L 33/223;
(Continued)

(56) References Cited

U.S. PATENT DOCUMENTS 2,188,006 A * 1/1940 Katcher ................ F16L 33/224
285/249
2,460,653 A * 2/1949 Raybould ............. F16L 33/224
285/249

(Continued)

FOREIGN PATENT DOCUMENTS

EP 0241656 A1 * 10/1987 ............ F16L 33/224
EP 0803672 A1 * 10/1997 ........... F16K 27/067
(Continued)

OTHER PUBLICATIONS

"How to make a PEX-AL-PEX compression fitting connection," PexUniverse, https://www.pexuniverse.com/how-make-pex-al-pex-compression-connection.

*Primary Examiner* — David Colon-Morales
(74) *Attorney, Agent, or Firm* — Alix, Yale & Ristas, LLP

(57) ABSTRACT

A no-crimp valve assembly employs a fitting which has an enlarged outer portion and a coaxial inner portion of reduced diameter. An axial groove is formed between the outer portion and the inner portion for receiving the end of a polymer pipe. A nut retainably receives a split ferrule. The split ferrule has a serrated inner surface. The nut is threaded to the outer threaded surface of the outer portion and the ferrule is compressed against the outer surface adjacent the end of the pipe to form a fluid tight connection and the inner surface of the pipe engages the reduced surface of the inner portion. In some embodiments, the inner portion carries one or more sealing rings or has a serrated or stepped inner surface which engages the inside surface of the pipe.

20 Claims, 12 Drawing Sheets

(51) Int. Cl.
*F16L 19/08* (2006.01)
*F16K 27/06* (2006.01)
*F16K 5/06* (2006.01)
*F16L 29/00* (2006.01)

(52) U.S. Cl.
CPC ............ *F16L 33/224* (2013.01); *F16K 5/061* (2013.01); *F16K 5/0642* (2013.01); *F16K 27/067* (2013.01)

(58) Field of Classification Search
CPC ........ F16L 47/04; F16K 5/061; F16K 5/0642; F16K 27/067
USPC ......................................................... 285/249
See application file for complete search history.

(56) References Cited

U.S. PATENT DOCUMENTS

| | | | | |
|---|---|---|---|---|
| 2,467,520 | A * | 4/1949 | Brubaker | F16L 33/224 285/249 |
| 2,552,077 | A * | 5/1951 | Williams | F16L 33/222 285/249 |
| 3,685,860 | A * | 8/1972 | Schmidt | F16L 33/224 285/249 |
| 3,870,349 | A * | 3/1975 | Oetiker | F16L 33/222 285/249 |
| 4,008,911 | A * | 2/1977 | Kiyooka | F16L 47/04 285/249 |
| 4,427,219 | A * | 1/1984 | Madej | F16L 47/04 285/249 |
| 5,246,200 | A * | 9/1993 | Barker | E03C 1/02 137/556 |
| 5,375,887 | A * | 12/1994 | Johnson | E03C 1/021 285/12 |
| 5,480,122 | A * | 1/1996 | Barker | E03C 1/02 137/614 |
| 5,558,375 | A * | 9/1996 | Newman | F16L 33/224 285/23 |
| 5,566,708 | A * | 10/1996 | Hobbs, Jr. | F16L 19/02 137/360 |
| 5,735,307 | A * | 4/1998 | Charron | F16K 5/0642 137/270 |
| 5,992,823 | A * | 11/1999 | Hung-Lin | F16K 5/061 251/315.1 |
| 6,467,819 | B2 * | 10/2002 | Seifert | B29C 45/1676 264/242 |
| 6,488,318 | B1 * | 12/2002 | Shim | F16L 19/061 285/322 |
| 6,655,412 | B2 * | 12/2003 | Reck | F16K 27/067 137/883 |
| 6,681,802 | B2 * | 1/2004 | McHugh | F16K 11/0873 137/559 |
| 6,702,258 | B1 * | 3/2004 | Pettinaroli | F16K 27/067 251/315.01 |
| 7,363,935 | B2 * | 4/2008 | Anderson | F16K 11/0876 137/271 |
| 7,374,212 | B1 * | 5/2008 | Gretz | F16L 19/041 285/341 |
| 7,469,936 | B2 * | 12/2008 | Norman | F16L 19/0206 285/249 |
| 7,644,958 | B2 * | 1/2010 | Postler | F16L 47/04 285/249 |
| 9,086,176 | B2 * | 7/2015 | Lai | F16L 19/065 |
| 9,683,685 | B2 * | 6/2017 | Ismert | E03D 1/32 |
| 9,897,216 | B1 * | 2/2018 | Kuo | F16K 5/0689 |
| 2007/0215828 | A1 * | 9/2007 | Cellemme, Jr. | F16K 5/0642 251/148 |
| 2008/0314466 | A1 * | 12/2008 | Cimberio | F16K 27/067 137/883 |
| 2011/0074149 | A1 * | 3/2011 | Matsui | F24H 9/128 285/363 |
| 2011/0163530 | A1 * | 7/2011 | Shih | F16L 19/065 285/24 |

FOREIGN PATENT DOCUMENTS

| | | | | |
|---|---|---|---|---|
| FR | 2230924 A1 | * | 12/1974 | ............ F16L 19/065 |
| GB | 2022752 A | * | 12/1979 | .............. F16L 47/04 |
| GB | 2121133 A | * | 12/1983 | ............ F16L 33/224 |
| WO | WO-9502782 A1 | * | 1/1995 | .............. F16L 47/04 |
| WO | WO-2013058358 A1 | * | 4/2013 | .............. F16L 47/04 |

* cited by examiner

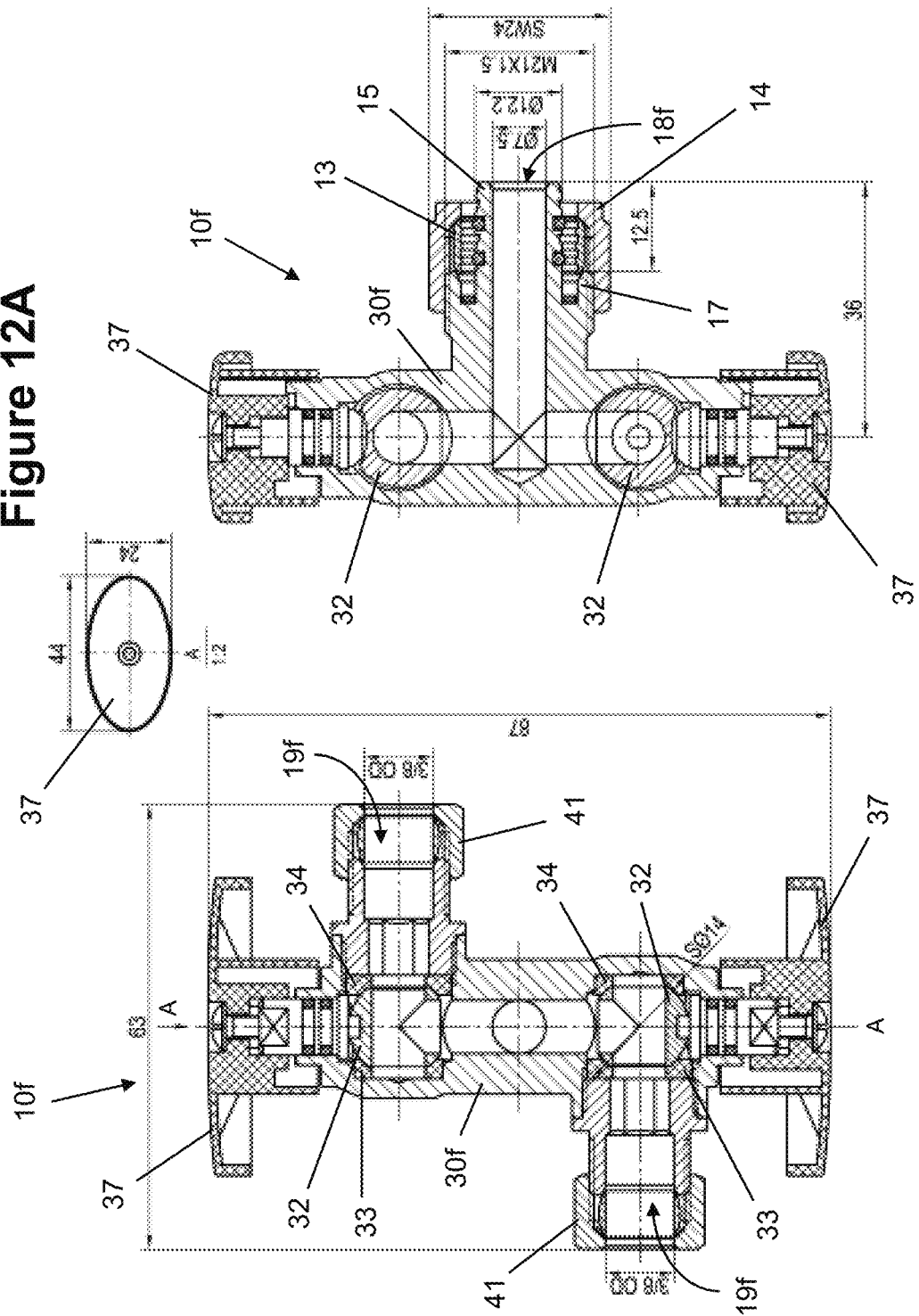

NO-CRIMP VALVE ASSEMBLY

BACKGROUND OF THE DISCLOSURE

The present disclosure relates to valves, and more particularly, to valve assemblies for use with pipes, in particular polymer (polyethylene) pipes, that can be attached without requiring a crimp ring/fitting and associated tools.

Typically, in building constructions, standard plumbing pipes are attached to valves or valve assemblies by crimping with a fitting and ring, soldering, threading, or what is known in the field as a "push-to-connect" fitting. Recently, polymer pipes have become more prevalent in newly-constructed building structures. The connection types for these known valves and valve assemblies require crimping with a ring and fitting with special tools or push-to-connect attachment. These valve connection types have shown numerous drawbacks when attempting to attach to polymer piping in that a minor variation in pipe outer diameter or deviation in the roundness of a pipe can cause the connection to be less robust, resulting in failure.

Products exist that allow attachment of a connection fitting to an end of a polymer pipe without crimping; however, such products or methods do not allow direct attachment of a valve unit to polymer pipes without the drawbacks associated with crimping or a push-to-connect fitting.

It would thus be useful to have a valve assembly that can be reliably connected directly to a polymer pipe without the drawbacks associated with known valve assemblies and their fittings. The disclosed embodiments provide a valve assembly with an integral end fitting that is connectable to a polymer pipe by utilizing a split ferrule and nut connection. The end fitting in the disclosed valve assembly significantly streamlines installation, as it can be attached using only a wrench, and also provides a robust connection to pipes with a variety of different outer diameters and roundness deviations. A fluid-tight connection is provided via compression of an annular sealing member, such as one or more O-rings, that tightly seal with the inner wall of the respective pipe (rather than the outer wall like known valve end fittings).

SUMMARY

Briefly stated, in a preferred form, the no-crimp valve assembly comprises a valve subassembly having an end fitting. The end fitting has an enlarged outer portion of a diameter D with an outer threaded surface and an inner reduced sleeve portion of reduced diameter with an axial groove defined between the enlarged portion and the inner reduced portion. A nut is threadable to the outer threaded surface. A split ferrule is retainably received by the nut. A polymer pipe is receivable in the groove and the nut is tightenable to the threaded surface wherein the ferrule engages the pipe to fluidly seal the pipe to the end fitting.

The reduced portion defines at least one coaxial recess and a sealing ring is received in the recess. Alternatively, the reduced portion may have two coaxially spaced recesses each defining a sealing ring. In one embodiment, the reduced portion has a plurality of barbs.

The split ferrule defines a serrated inner surface which engages the exterior surface of the pipe. The split ferrule further comprises a pair of opposed tapered end portions. The nut has an interior tapered portion and the enlarged outer portion has an inwardly tapered end portion adjacent the groove. The tapered portions of the ferrule engage the tapered portions of the nut and the enlarged outer portion upon tightening the nut to the outer threaded surface.

In another embodiment, a second fitting has an enlarged outer portion of diameter $D_2$ with an outer threaded surface with an inner reduced sleeve portion of reduced diameter $d_2$ with an axial groove defined between the enlarged outer portion and the inner portion and a second nut threadable to the outer threaded portion and a second split ferrule retainably received by the second nut so that a second polymer pipe is receivable in the second groove and the second nut is tightenable to the threaded surface wherein the second ferrule engages the second pipe to fluidly seal the second pipe to the second fitting.

The end fitting and the second fitting are coaxial. In one embodiment, $D=D_2$ and $d=d_2$.

In one disclosed embodiment, the valve assembly has a first outlet fitting and further comprising a second valve subassembly and a second outlet fitting. The second valve subassembly is in selective communication with the end fitting.

In another embodiment, a no-crimp valve assembly comprises a valve subassembly having an end fitting. The end fitting has an enlarged outer portion of a diameter D with an outer threaded surface and an inner reduced sleeve portion of reduced diameter d with an axial groove defined between the enlarged portion and the inner reduced portion and the reduced portion has a circumferential seal element. A nut is threadable to the outer threaded surface. A split ferrule retainably received by the nut has a serrated inner surface. A pipe is receivable in the groove and the nut is tightenable to the threaded surface wherein the ferrule engages the pipe to fluidly seal the pipe to the end fitting.

The reduced portion defines a coaxial recess and the circumferential seal element comprises a sealing ring received in the recess and interiorly sealable against the pipe. The split ferrule serrated surface engages an exterior surface of the pipe. In another embodiment, the circumferential element comprises a plurality of axially spaced barbs. The split ferrule further comprises a pair of opposed exterior tapered surfaces. The nut has an interior tapered portion and the enlarged outer portion has an inwardly tapered portion adjacent the groove. The tapered portions of the ferrule engage the tapered portions of the nut and the enlarged outer portion upon tightening the nut to the outer threaded surface to force the ferrule to compress against the pipe received in the groove.

In one embodiment, a second fitting has an enlarged outer portion of diameter $D_2$ with an outer threaded surface and an inner reduced sleeve portion of reduced diameter $d_2$ with an axial groove defined between the enlarged outer portion and the inner portion. A second nut is threadable to the outer threaded portion and a second split ferrule is retainably received by the second nut so that a second pipe is receivable in the second groove and the second nut is tightenable to the threaded surface wherein the second ferrule engages the second pipe to fluidly seal the second pipe to the second fitting.

The end fitting and the second fitting are preferably coaxial. A second valve subassembly is in selective communication with the end fitting.

BRIEF DESCRIPTION OF THE DRAWINGS

Aspects of the preferred embodiment will be described in reference to the drawings, where like numerals reflect like elements:

FIG. 12 is a sectional view, partly diagrammatic, of a dual handle/dual outlet no-crimp valve assembly;

FIG. 12A is a reduced top view, partly diagrammatic, of a handle for the no-crimp valve assembly of FIG. 12; and FIG. 13 is a sectional view of the dual handle/dual outlet valve assembly of FIG. 12, taken along the lines A-A thereof.

DETAILED DESCRIPTION

Figure 1:
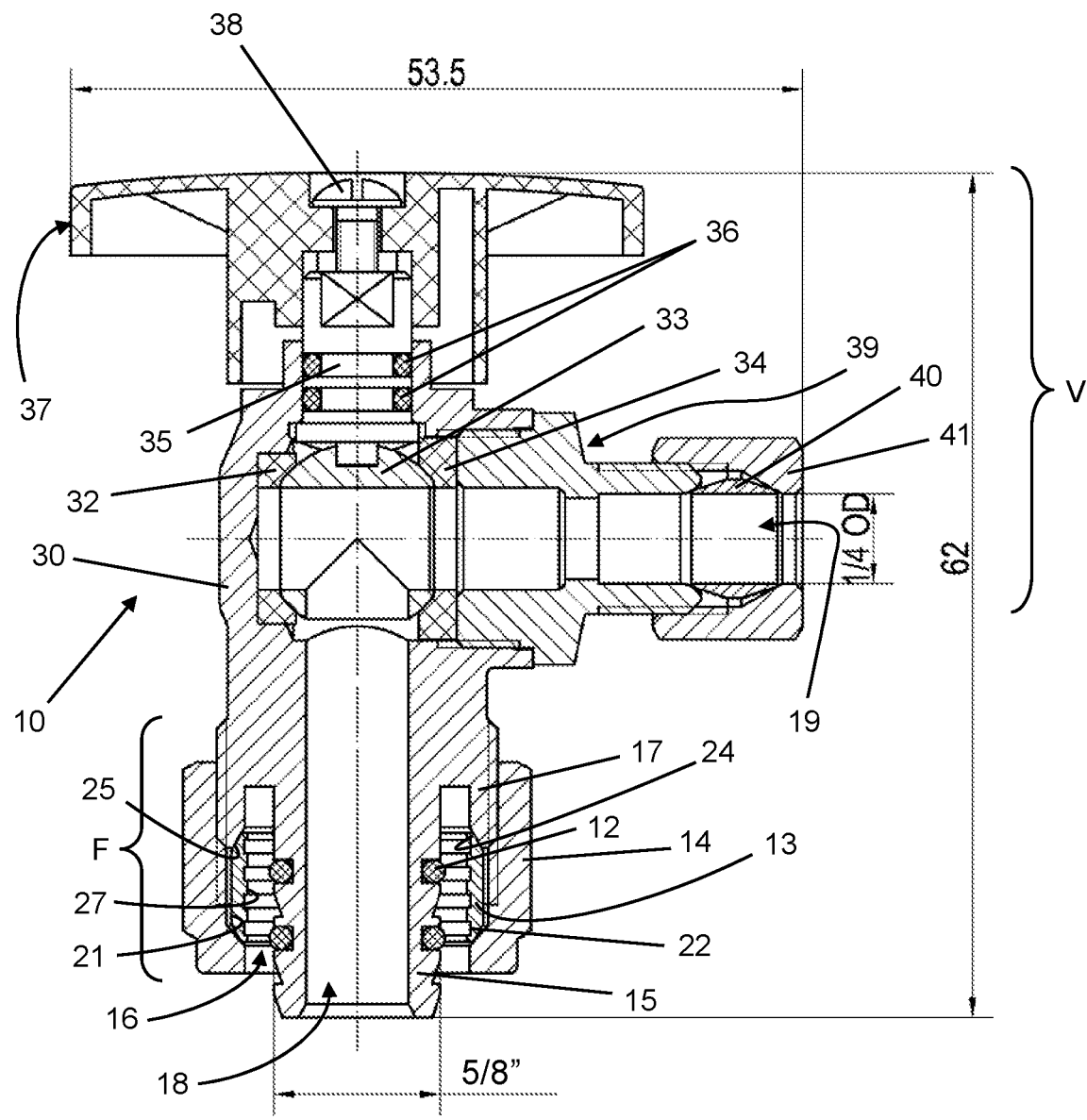
FIG. 1 is a sectional view, partly diagrammatic, of a first embodiment of a no-crimp valve assembly.

With reference to the drawings wherein like numerals represent like parts throughout the Figures, a first embodiment of the disclosed valve assembly 10 is shown. The compression fitting unit F is configured for attachment to an end of a pipe P, preferably a polymer pipe. The valve assembly has a bifurcated inlet fitting comprising an inner quasi-sleeve-like portion 15 of reduced diameter and an outer coaxial quasi-sleeve-like portion 17 of enlarged diameter. A coaxial annular groove 16 extends between the inner portion 15 and the outer portion 17. The attachment is implemented by trapping the pipe in the groove 16 between the reduced diameter portion 15 of the end fitting preferably that carries two annular sealing members 12, and an intermediate sleeve or split ferrule 13.

Figure 2:
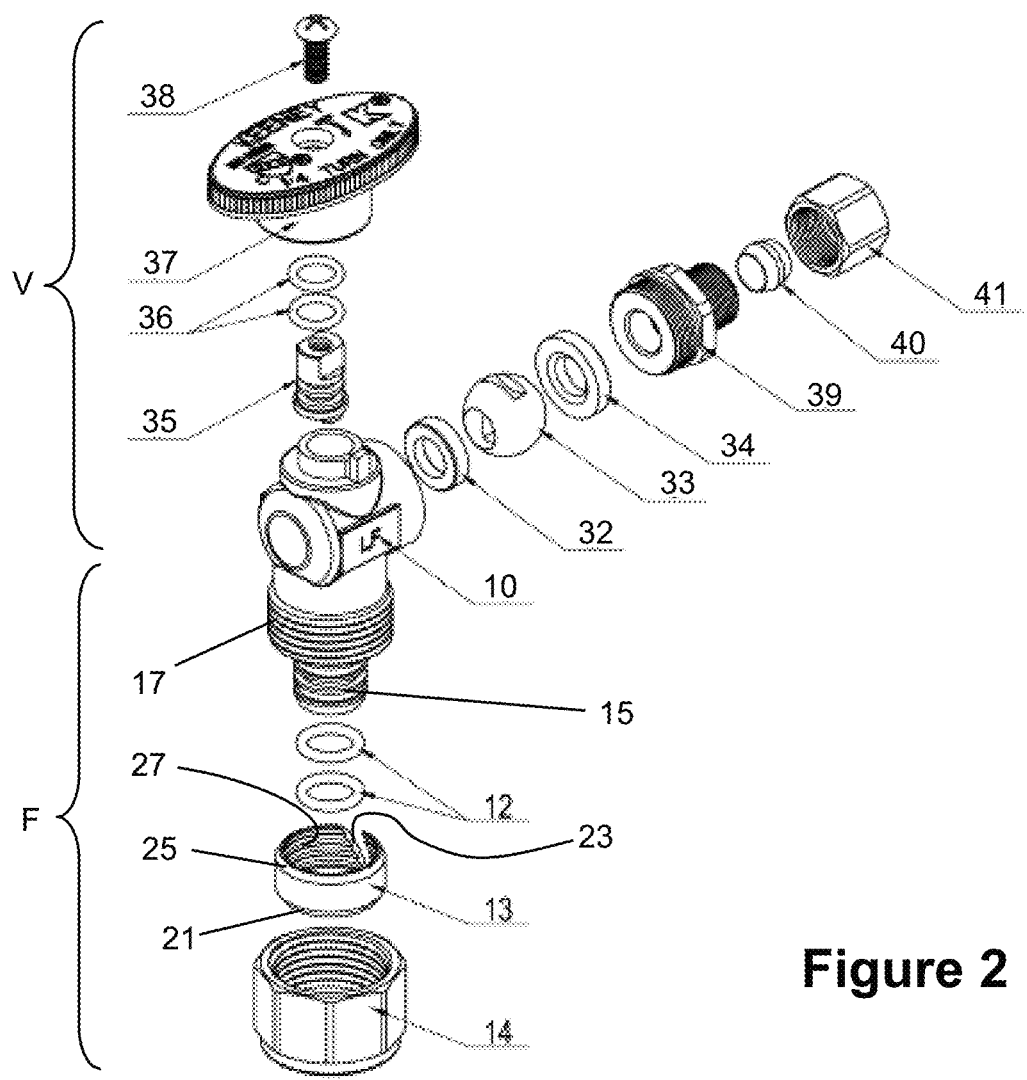
FIG. 2 is an exploded perspective view of the no-crimp valve assembly of FIG. 1.
Figure 3:
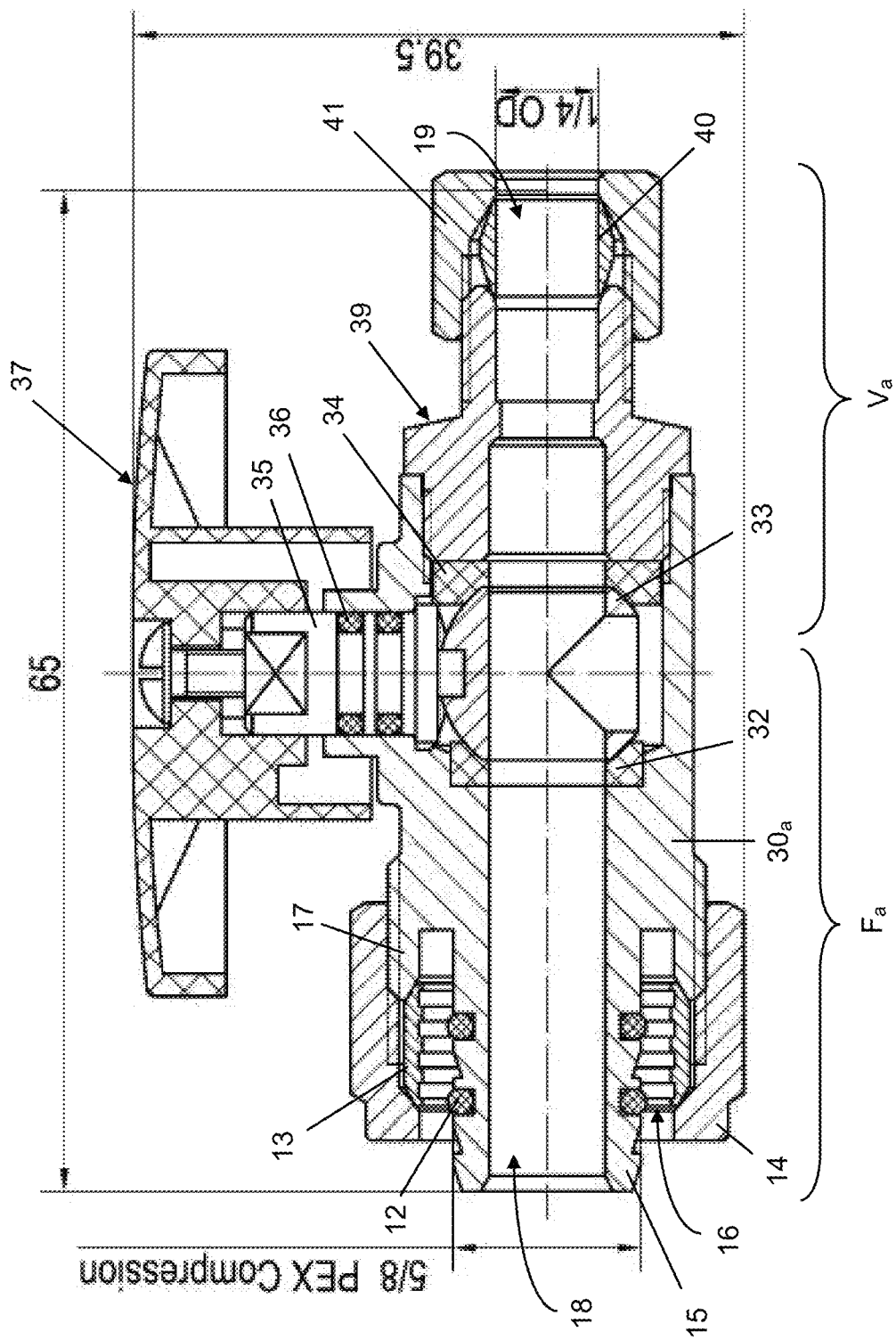
FIG. 3 is a sectional view, partly diagrammatic, of a second embodiment of a no-crimp valve assembly.
Figure 4:
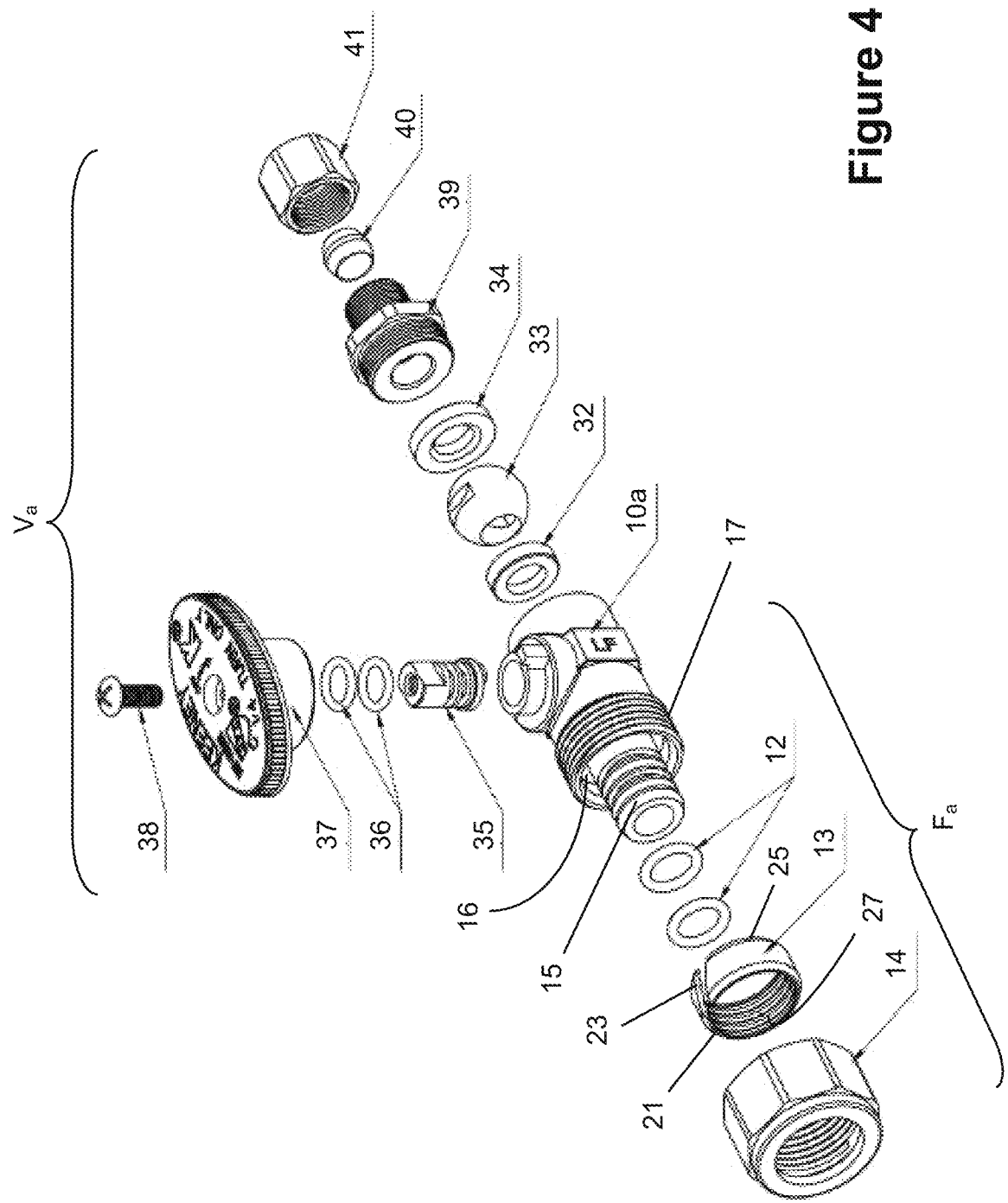
FIG. 4 is an exploded perspective view of the no-crimp valve assembly of FIG. 3.

As shown clearly in FIG. 2, the sleeve or ferrule 13 has a diagonal slit 23 in a portion of the body that allows it to be tightened, resulting in a reduction in diameter. In operation, a nut 14 is threaded to the larger diameter portion 17 of the end fitting. The nut 14 receives the ferrule 13. Upon tightening the nut 14, the ferrule 13 is forced to tighten around the outer wall of the pipe P thereby trapping the pipe against the reduced diameter portion 15 and creating a robust fluid tight circumferential seal between the sealing members 12 and inner wall of the pipe P.

It will be appreciated that the split ferrule 13 includes opposed tapered portions 21 and 25. The nut 14 has an interior tapered portion 22 and the enlarged portion of the fitting has an inwardly tapered portion 24 adjacent the groove 16. The ferrule 13 preferably includes serrations 27 on its interior surface. Upon tightening the nut, the tapered portion of the nut 22 and the ferrule end portion 21 and the tapered portion 24 of the fitting and the ferrule portion 15, also engage and function to inwardly compress the ferrule 13 against the pipe. The serrations 27 engage the pipe exterior.

As can be seen, the assembly 10 includes a valve unit V that is integral to the fitting unit F (i.e., a valve does not need to be separately attached to the pipe or fitting F during installation). In FIGS. 1 and 2, reference numerals 32-41 represent components that make up a representative valve unit V of the assembly 10.

A valve body mounts a ball valve 33 engageable against a seat 32 and a seat 34. A stem 35 engages the ball valve and connects with a handle 37 for rotating the ball valve to open and close the valve. One or more O-rings 36 are mounted to the stem 35 for sealing the subassembly with the body. A screw 38 secures the handle to the stem. An adaptor 39 threads to the body 30 and receives a sleeve 40. A nut 41 threads to the adaptor. The body 30 integrally connects with the fitting subassembly F. The valve unit may assume numerous forms (not illustrated).

Figure 5:
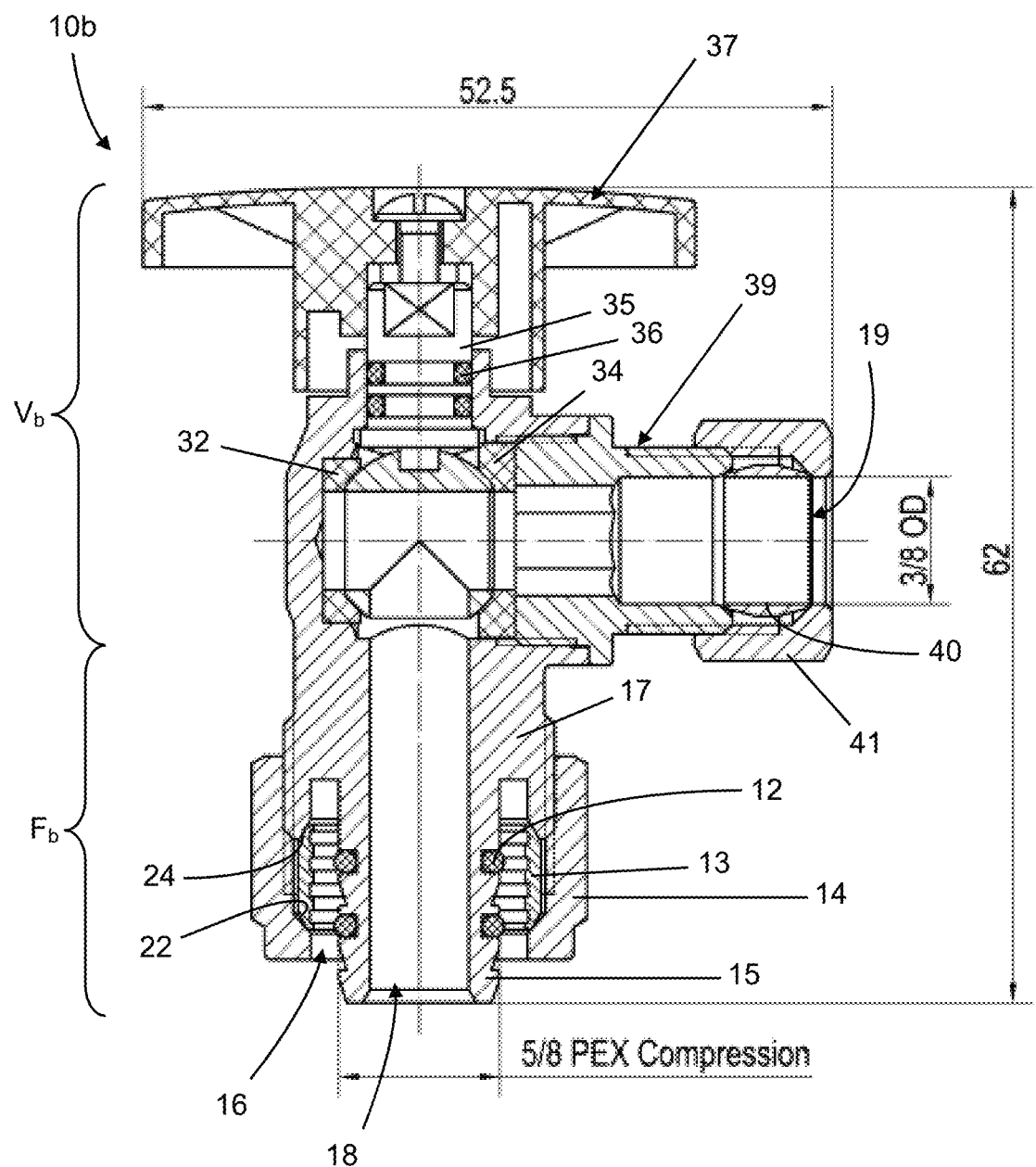
FIG. 5 is a sectional view, partly diagrammatic, of a third embodiment of a no-crimp valve assembly.
Figure 6:
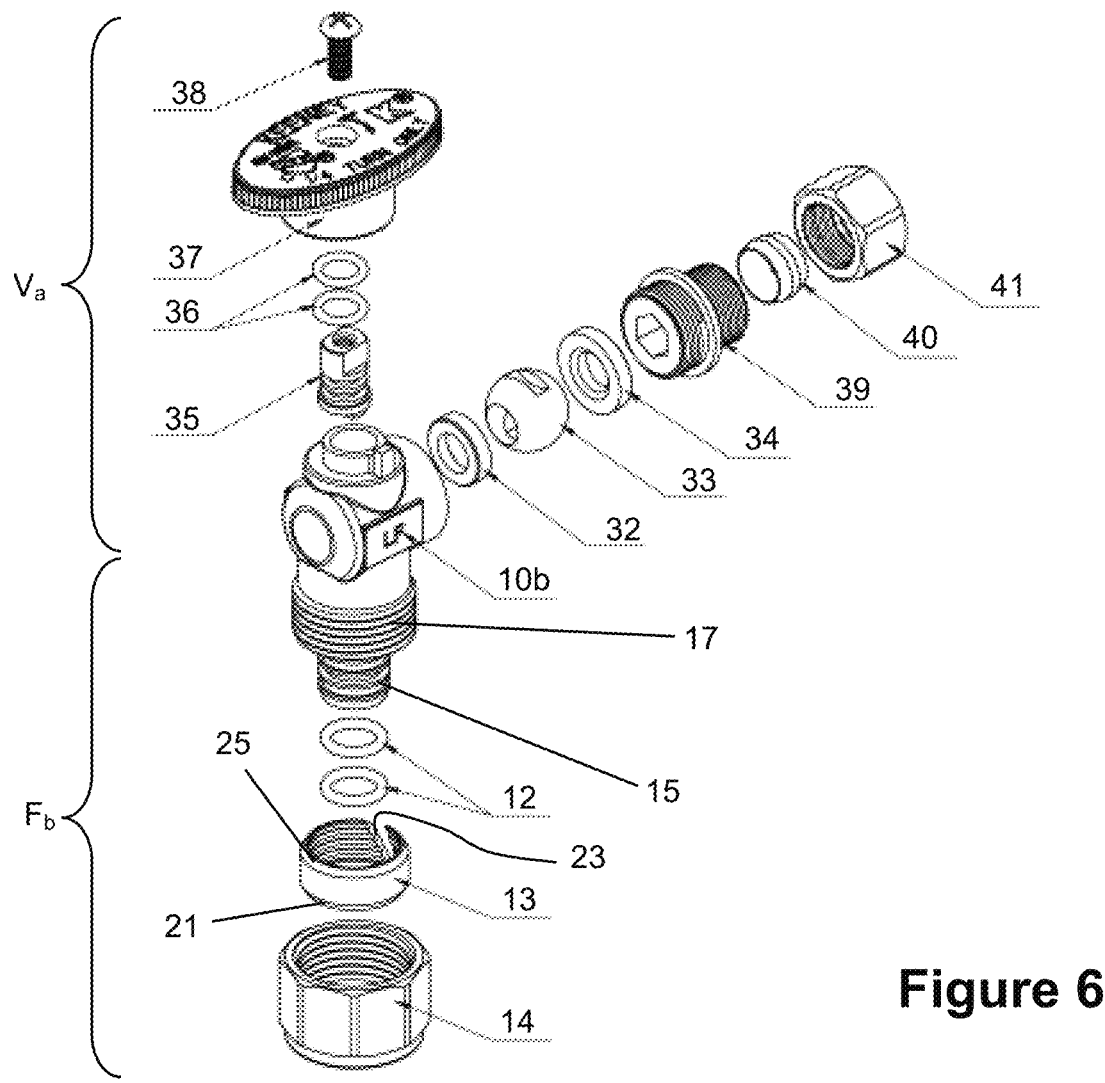
FIG. 6 is an exploded perspective view of the no-crimp valve assembly of FIG. 5.
Figure 7:
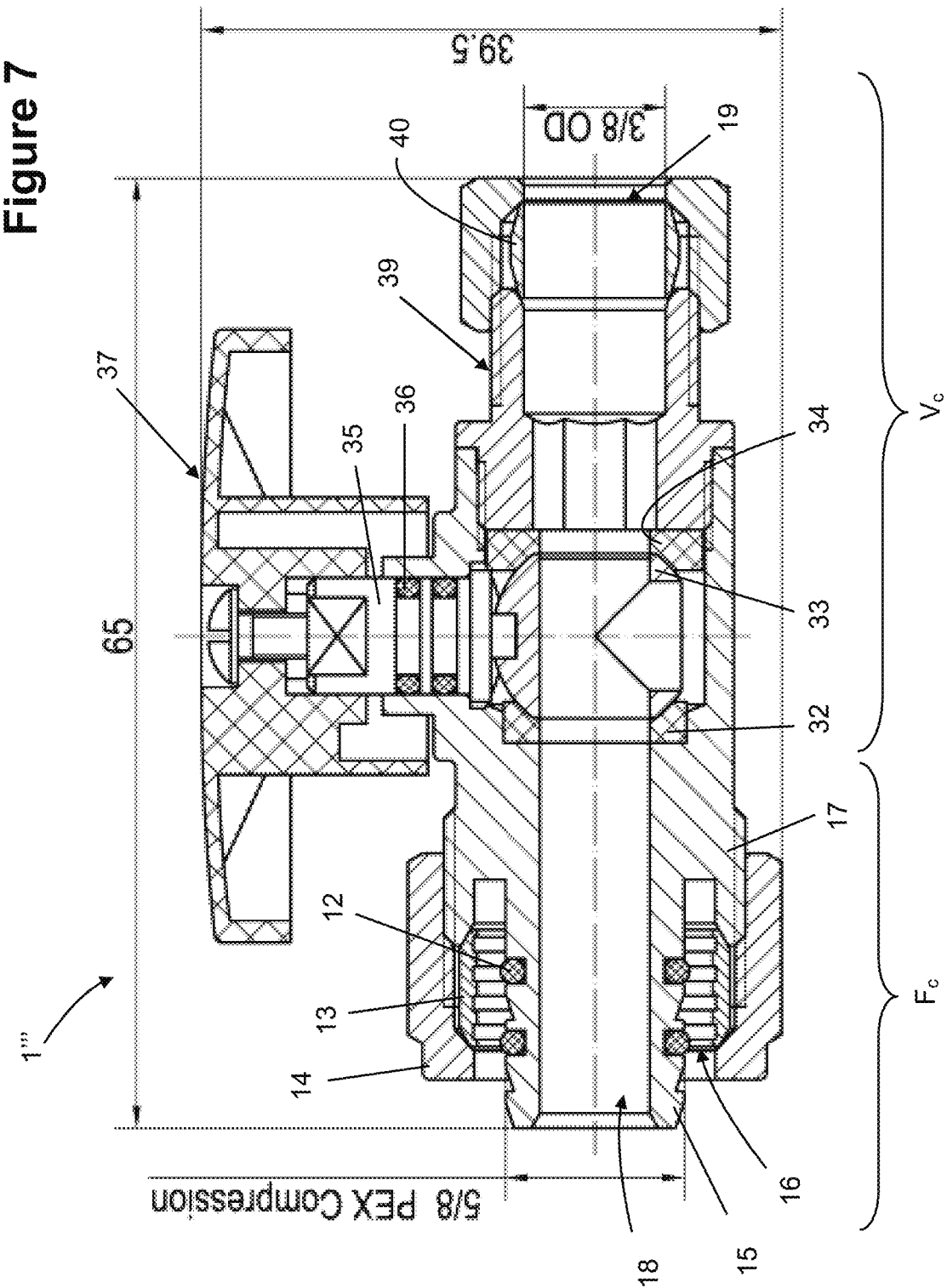
FIG. 7 is a sectional view, partly diagrammatic, of a fourth embodiment of a no-crimp valve assembly.
Figure 8:
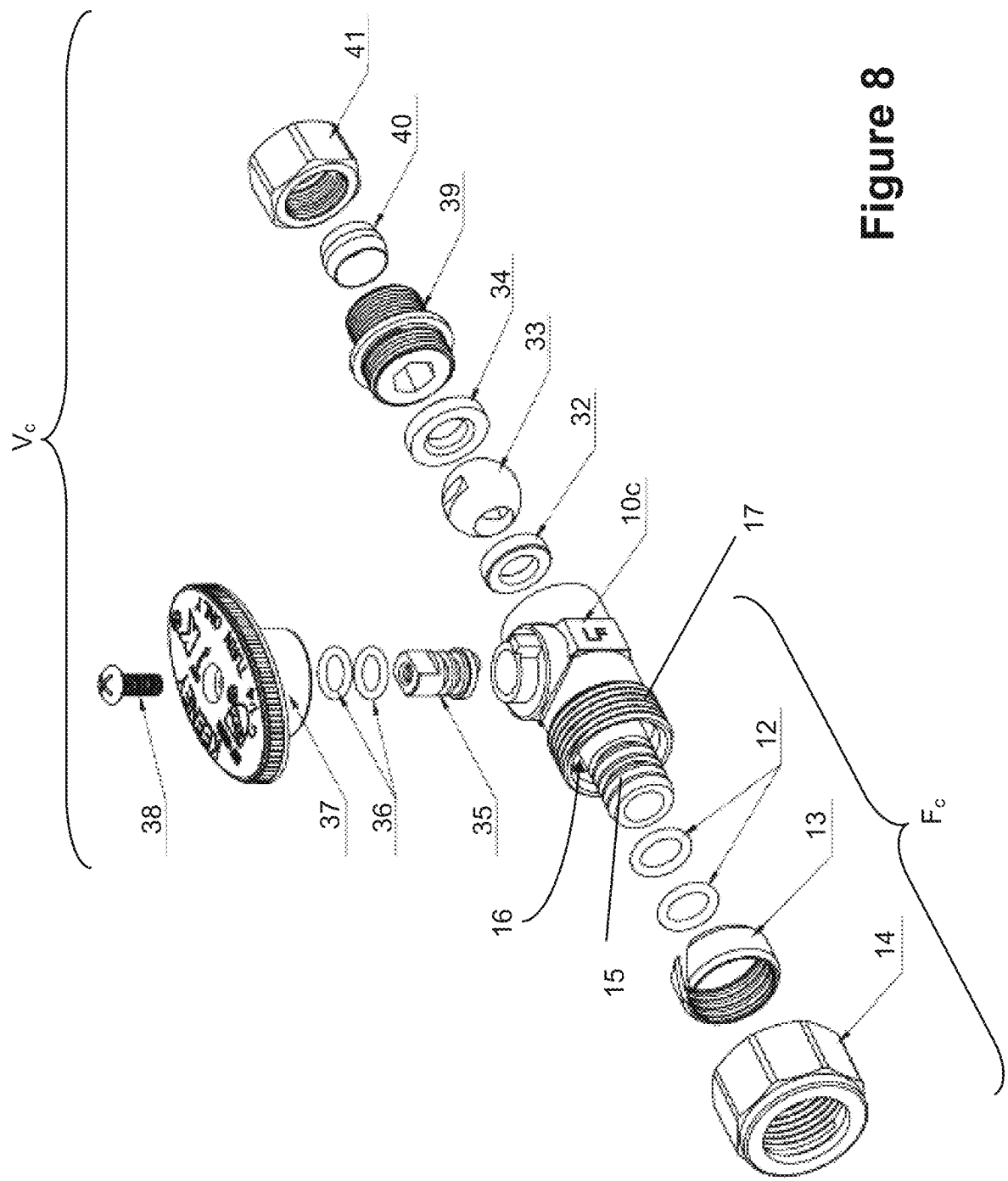
FIG. 8 is an exploded perspective view of the no-crimp valve assembly of FIG. 7.
Figure 9:
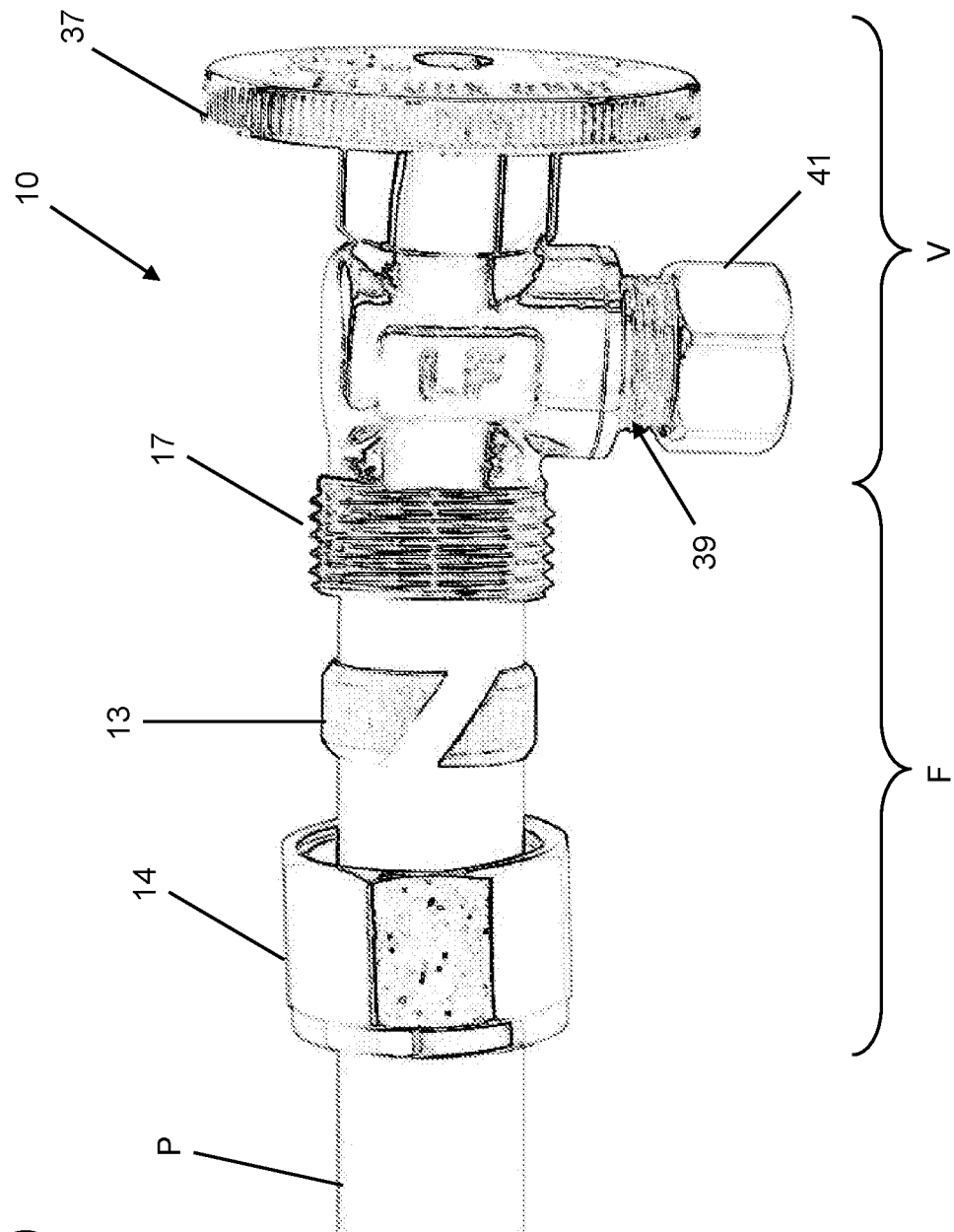
FIG. 9 is a photograph of a no-crimp valve assembly in a pre-installed state together with a polymer pipe.

The embodiment of FIGS. 1 and 2 is L-shaped with the fitting unit inlet 18 and valve unit outlet 19 being perpendicular to one another. FIGS. 5 and 6 depict a similar L-shaped assembly 10b, but with differing dimensions from the embodiment of the assembly 10 from FIGS. 1 and 2.

FIGS. 3-4 and 7-8 depict valve assemblies, 10a and 10c with substantially straight flow paths (i.e., the outlets of the valve units, $V_a$ and $V_c$, are coaxial with the inlets on the fitting units, $F_a$ and $F_c$).

Figures 10, 10A:
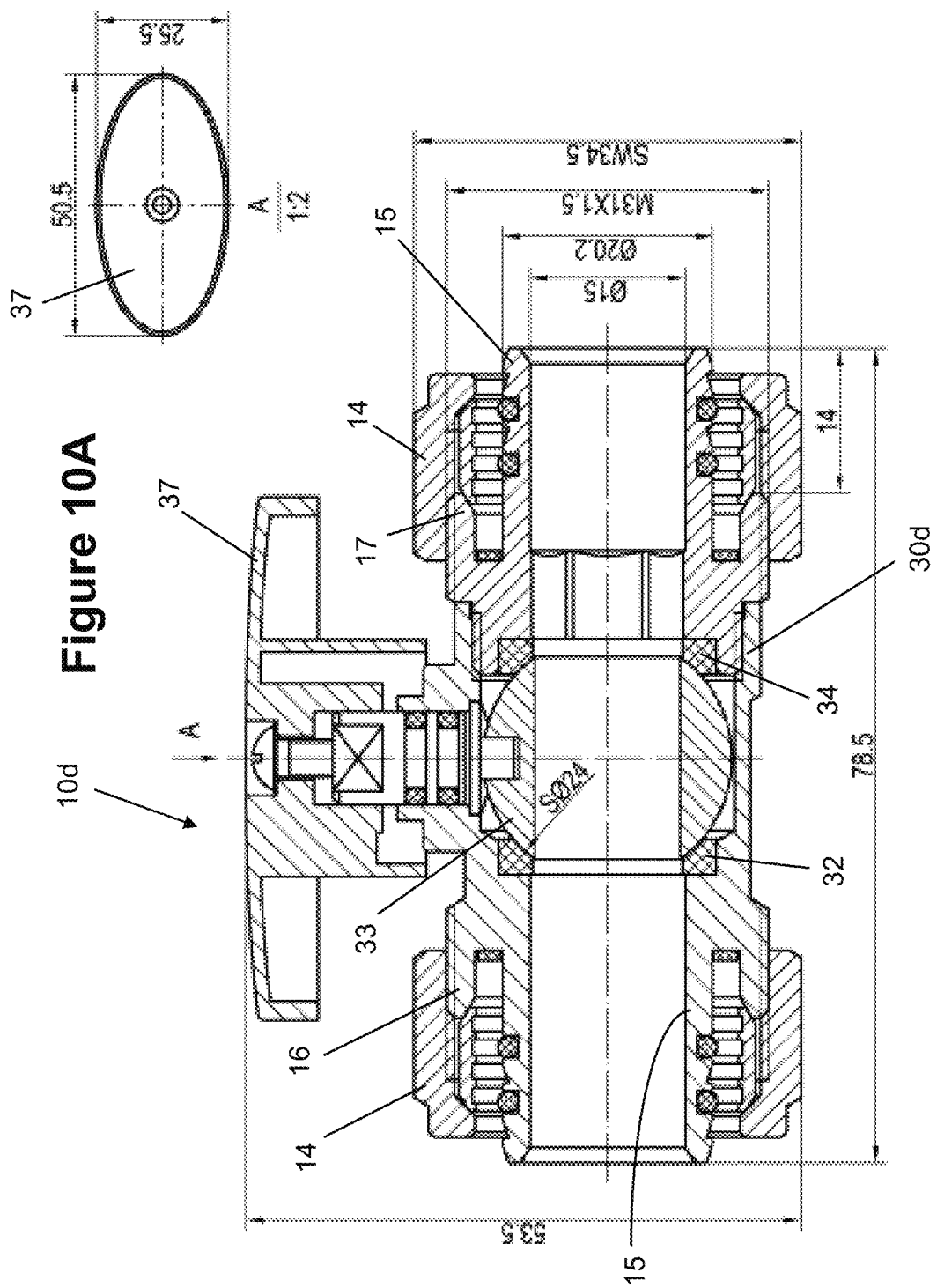
FIG. 10 is a sectional view, partly diagrammatic, of a fifth inline embodiment of a no-crimp valve assembly.
FIG. 10A is a reduced top view of a handle for the no-crimp valve assembly of FIG. 10.

FIG. 10 illustrates an inline valve assembly 10d with a linear flow path through valve unit $V_d$ and which is coaxial with a pair of substantially identical fitting units $F_d$ to form an inlet and an outlet passage through the valve. The no-crimp valve assembly 10d employs two substantially identical nuts 14 which are threaded to larger diameter portions 17 of end fitting. Each nut receives a split ferrule 13 which engages against and captures the pipe P in the groove against the reduced diameter portion 15 when the nut is tightened. This creates a robust watertight circumferential seal. It will be appreciated that each of the reduced portions 15 receives a seal ring 12 as depicted. The valve units in FIG. 10 need not be identical, but may be of different sizes. However, the fittings are preferably coaxial to form an inlet and outlet passage through the valve.

Figure 11:
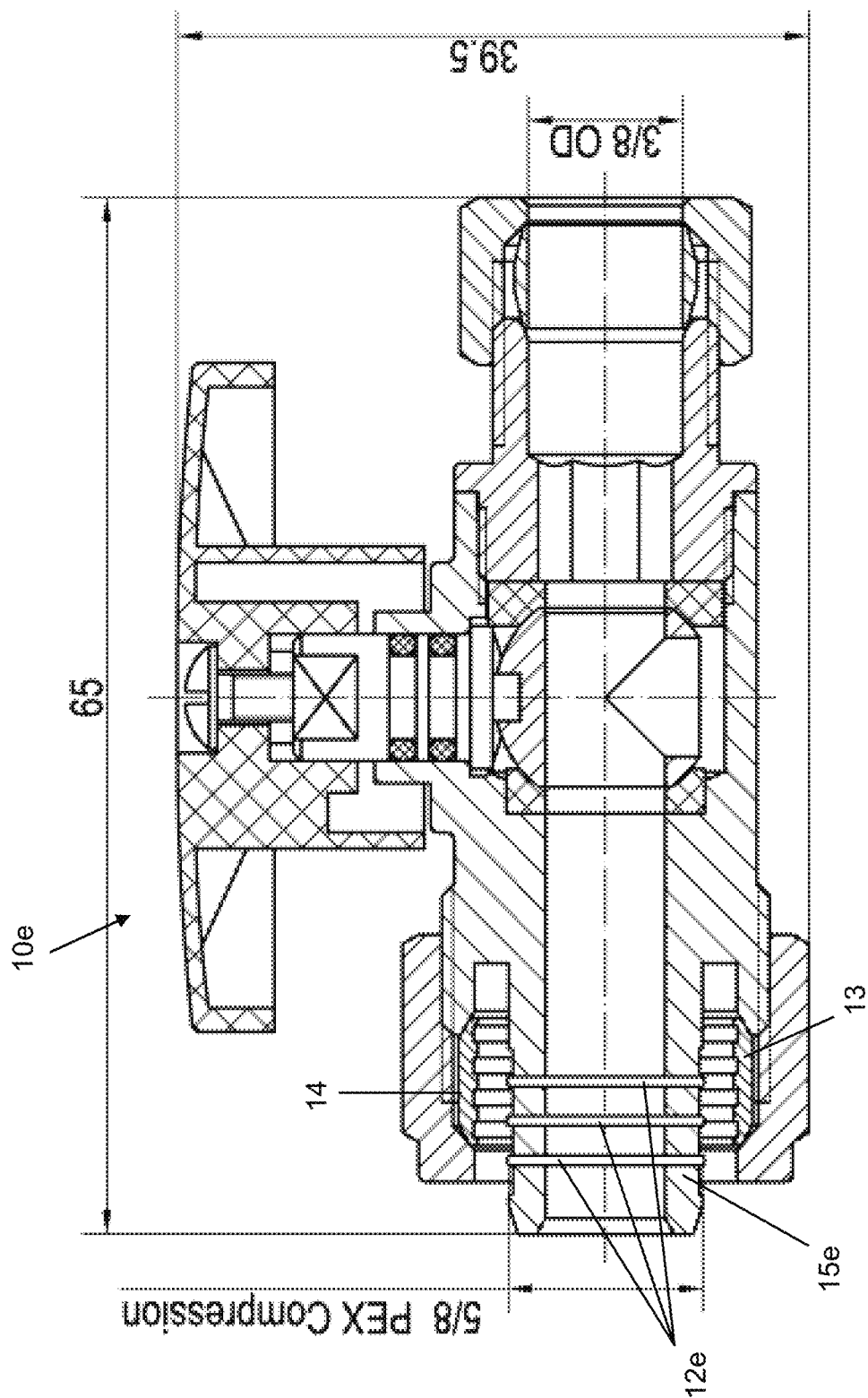
FIG. 11 is a sectional view, partly diagrammatic, of a sixth embodiment of a no-crimp valve assembly.

With reference to FIG. 11, valve assembly 10e differs from previously described valve assemblies, principally in terms of the sealing of the inner surface of the pipe P with the inner portion of the end fitting. The inner portion 15e in FIG. 11 does not employ sealing rings or elastomer O-rings. Instead, it employs axially spaced integral barbs 12e which, upon compression by the ferrule 13, engage the cylindrical inner wall of the pipe to provide a watertight seal.

With reference to FIGS. 12, 12A and 13, a dual handle/dual outlet valve no-crimp valve assembly 10f involves two independent valves and two independent outlet fittings. It should be appreciated that the outlet fittings are illustrated as being identical. However, in some embodiments, the outlet fittings may have different dimensions. Each of the outlet fittings, however, incorporates the no-crimp valve assembly features as previously described.

As should be evident, corresponding components in the embodiments of the assembly 10a, 10b, 10c, 10d, 10e and 10f, which have a different configuration than the described valve assembly 10, are identified with like numerals with a letter notation in successive embodiments. Certain Figures include key dimensions of the respective embodiment, which are exemplary and non-limiting. All of the disclosed embodiments are exemplary of the inventive spirit and concepts of the disclosed no-crimp valve assembly, which include a fitting unit configured for attachment to a polymer pipe without crimping or similar attachment and an integral valve unit.

The embodiments have shown significant improvements over known methods and products for attachment to polymer pipes without crimping, and which require separate attachment of a valve unit somewhere within the flow pathway. The embodiments disclosed herein with a fitting unit F and integral valve unit V allow a robust fluid tight attachment between the valve unit and flow path through a polymer pipe P, unlike known products and methods for attaching valves to polymer pipes. Additionally, while the depicted embodiments all include a ball valve unit, embodiments that incorporate other types of valves for regulating fluid flow exist and fall within the inventive scope of the disclosure.

While a preferred embodiment has been set forth for purposes of illustration, the foregoing description should not be deemed a limitation of the invention herein. Accordingly, various modifications, adaptations and alternatives may occur to one skilled in the art without departing from the spirit of the invention and scope of the claimed coverage.

What is claimed is:

1. A no-crimp valve assembly comprising:
   a valve subassembly having an end fitting, wherein the end fitting is integrally formed with a valve body of the valve assembly;
   said end fitting having an enlarged outer portion of diameter D with an outer threaded surface and an inner reduced sleeve portion of reduced diameter d with an axial groove defined between said enlarged outer portion and said inner reduced portion;
   a nut threadable to said outer threaded surface; and
   a split ferrule retainably received by said nut, wherein the split ferrule comprises a pair of opposed tapered portions and a serrated inner surface;
   so that a polymer pipe is receivable in said groove and said nut is tightenable to said threaded surface wherein said ferrule engages said pipe to fluidly seal said pipe to said end fitting, wherein a tapered portion of the enlarged outer portion is positioned between the ferrule and a threaded portion of the nut when the nut is threaded on to the enlarged outer portion.

2. The no-crimp valve assembly of claim 1 wherein said reduced portion defines at least one coaxial recess and a sealing ring is received in said recess.

3. The no-crimp valve assembly of claim 1 wherein said reduced portion defines two coaxial axially spaced recesses each receiving a sealing ring.

4. The no-crimp valve assembly of claim 1 wherein the serrated inner surface is configured to engage an exterior surface of the pipe.

5. The no-crimp valve assembly of claim 1 wherein a part of the enlarged outer portion is between a portion of the serrated inner surface of the split ferrule and the nut.

6. The no-crimp valve assembly of claim 1 wherein the nut has an interior tapered portion and the enlarged outer portion has an inwardly tapered portion adjacent the groove and wherein said tapered portions of the ferrule engage the tapered portions of the nut and enlarged outer portion upon tightening the nut to the outer threaded surface.

7. The no-crimp valve assembly of claim 1 wherein said reduced portion has a plurality of barbs.

8. The no-crimp valve assembly of claim 1 further comprising a second fitting having an enlarged outer portion of diameter $D_2$ with an outer threaded surface and an inner reduced sleeve portion of reduced diameter $d_2$ with an axial groove defined between said enlarged outer portion and said inner portion and a second nut threadable to said second outer threaded surface and a second split ferrule retainably received by said second nut so that a second polymer pipe is receivable in said second groove and said second nut is tightenable to the threaded surface wherein the second ferrule engages said second pipe to fluidly seal said second pipe to said second fitting.

9. The no-crimp valve assembly of claim 8 wherein said end fitting and said second fitting are coaxial.

10. The no-crimp valve assembly of claim 9 wherein $D=D_2$ and $d=d_2$.

11. The no-crimp valve assembly of claim 1 wherein said valve assembly has a first outlet fitting and further comprising a second valve sub-assembly and a second outlet fitting, said second valve sub-assembly in selective communication with said end fitting.

12. The no-crimp valve assembly of claim 1 further comprising a second fitting having an enlarged outer portion of diameter $D_2$ with an outer threaded surface and an inner reduced sleeve portion of reduced diameter $d_2$ with an axial groove defined between said enlarged outer portion and said inner portion and a second nut threadable to said outer threaded surface and a second split ferrule retainably received by said second nut so that a second pipe is receivable in said second groove and said second nut is tightenable to the threaded surface wherein the second ferrule engages said second pipe to fluidly seal said second pipe to said second fitting.

13. The no-crimp valve assembly of claim 12 wherein said end fitting and said second fitting are coaxial.

14. The no-crimp valve assembly of claim 1 further comprising a second valve sub-assembly and a second fitting, said second valve sub-assembly being in selective communication with said end fitting.

15. A no-crimp valve assembly comprising:
   a valve subassembly having an end fitting, wherein the end fitting is integrally formed with a valve body of the valve assembly;
   said end fitting having an enlarged outer portion of diameter D with an outer threaded surface and an inner reduced sleeve portion of reduced diameter d with an axial groove defined between said enlarged outer portion and said inner reduced portion, said reduced portion having a circumferential seal;
   a nut threadable to said outer threaded surface; and
   a split ferrule retainably received by said nut, wherein the split ferrule comprises a pair of opposed tapered portions and a serrated inner surface;
   so that a pipe is receivable in said groove and said nut is tightenable to said threaded surface wherein said ferrule engages said pipe to fluidly seal said pipe to said end fitting, wherein a tapered portion of the enlarged outer portion is positioned between the ferrule and a threaded portion of the nut when the nut is threaded on to the enlarged outer portion.

16. The no-crimp valve assembly of claim 15 wherein said reduced portion defines a coaxial recess and the circumferential seal comprises a sealing ring received in said recess and interiorly sealable against said pipe.

17. The no-crimp valve assembly of claim 15 wherein the split ferrule serrated inner surface engages an exterior surface of the pipe.

18. The no-crimp valve assembly of claim 15 wherein said circumferential seal comprises a plurality of axially spaced barbs.

19. The no-crimp valve assembly of claim 15 wherein a part of the enlarged outer portion is between a portion of the serrated inner surface of the split ferrule and the nut.

20. The no-crimp valve assembly of claim 15 wherein the nut has an interior tapered portion and the enlarged outer portion has an inwardly tapered portion adjacent the groove and wherein said tapered portions of the ferrule engage the tapered portions of the nut and the enlarged outer portion upon tightening the nut to the outer threaded surface to force the ferrule to compress against the pipe received in the groove.

\* \* \* \* \*